(12) United States Patent
Ishizuka et al.

(10) Patent No.: US 7,336,834 B2
(45) Date of Patent: Feb. 26, 2008

(54) IMAGE PROCESSING SYSTEM

(75) Inventors: Masanori Ishizuka, Kawasaki (JP); Tatsushi Otsuka, Kawasaki (JP); Takahiko Tahira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 598 days.

(21) Appl. No.: 11/010,322

(22) Filed: Dec. 14, 2004

(65) Prior Publication Data

US 2006/0023954 A1 Feb. 2, 2006

(30) Foreign Application Priority Data

Jul. 29, 2004 (JP) .............................. 2004-221741

(51) Int. Cl.
*G06K 9/36* (2006.01)
(52) U.S. Cl. ...................... 382/232; 382/233; 382/166; 382/305
(58) Field of Classification Search ................ 382/232, 382/233, 238, 236, 243, 162, 166, 305; 713/176; 375/240.12, E7.1, E7.027, 240.01; 709/247; 348/714, 180, 572; 386/E5.067; 380/202
See application file for complete search history.

(56) References Cited

U.S. PATENT DOCUMENTS

| | | | | |
|---|---|---|---|---|
| 5,854,902 A | * | 12/1998 | Wilson et al. | ............... 709/247 |
| 6,075,899 A | * | 6/2000 | Yoshioka et al. | ........... 382/233 |
| 6,233,279 B1 | * | 5/2001 | Boon | ..................... 375/240.08 |
| 6,301,299 B1 | * | 10/2001 | Sita et al. | .............. 375/240.01 |
| 6,618,508 B1 | * | 9/2003 | Webb et al. | ................. 382/238 |
| 6,983,016 B2 | * | 1/2006 | Hourunranta | .......... 375/240.12 |
| 7,159,117 B2 | * | 1/2007 | Tanaka | ........................ 713/176 |

FOREIGN PATENT DOCUMENTS

JP 05-183891 7/1993

* cited by examiner

*Primary Examiner*—Anh Hong Do
(74) *Attorney, Agent, or Firm*—Arent Fox LLP

(57) ABSTRACT

In an image processing system, an image-input-processing unit divides an original image into portions so as to generate divided original images, and writes the divided original images in an encoder-side memory so that luminance data and chrominance data of each of the divided original images are stored in different storage areas. When predictive coding is performed, the encoding unit divides a reference image into portions so as to generate divided reference images which include information necessary for predictive coding of the divided original images, stores the divided reference images. The decoding unit divides and decodes an inputted encoded image so as to generate divided decoded-data sets, and writes the divided decoded-data sets in a decoder-side memory so that luminance data and chrominance data in each of the divided decoded-data sets are stored in different storage areas.

10 Claims, 15 Drawing Sheets

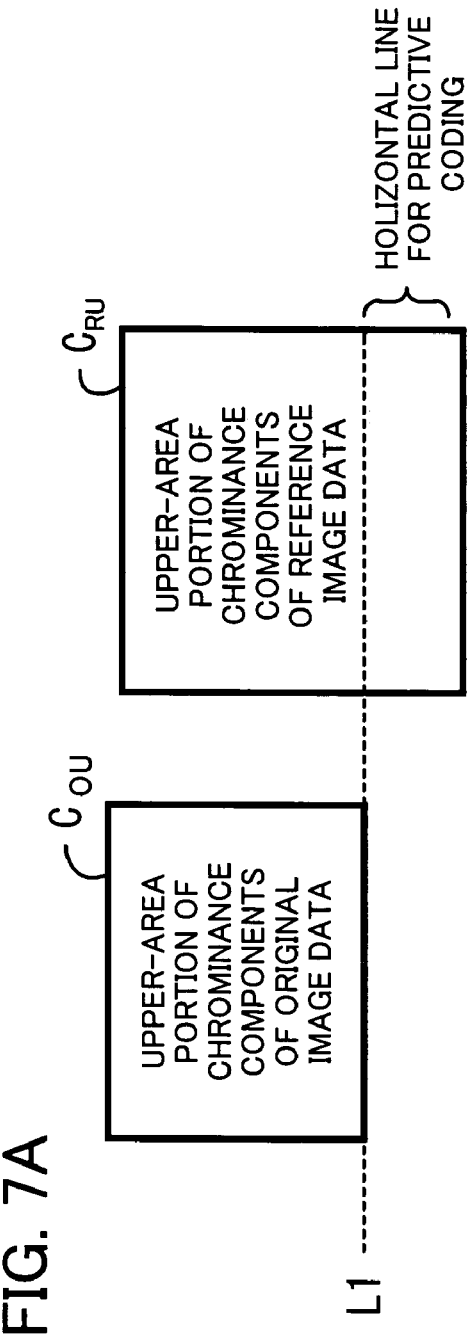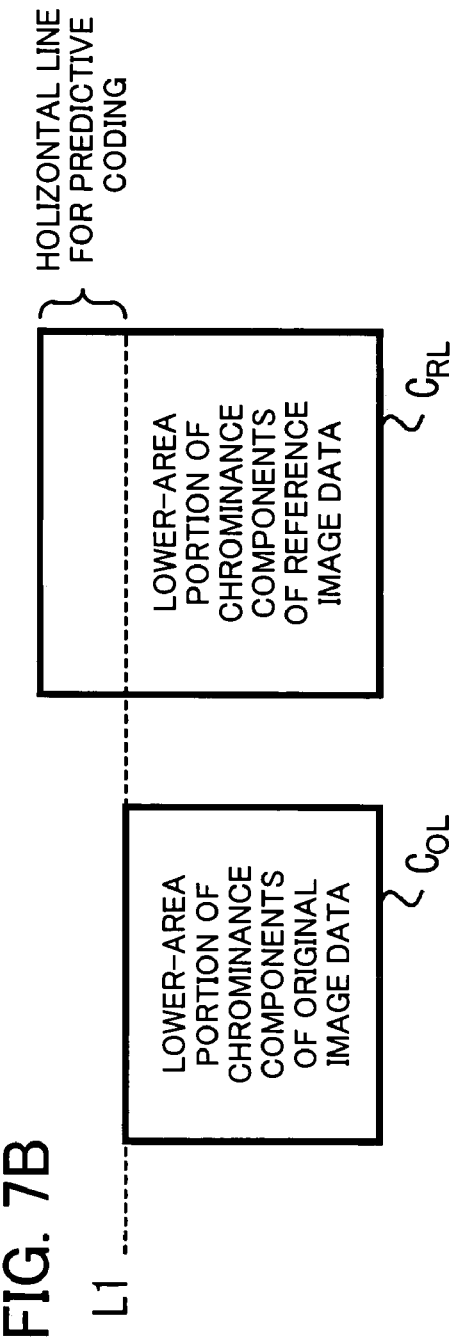

|  | LUMINANCE COMPONENTS | CHROMINANCE COMPONENTS |
|---|---|---|
| MEMORY (U) | UPPER AREA | LOWER AREA |
| MEMORY (M) | MIDDLE AREA | UPPER AREA |
| MEMORY (L) | LOWER AREA | MIDDLE AREA |

FIG. 13

IMAGE PROCESSING SYSTEM

CROSS-REFERENCE TO RELATED APPLICATIONS

This application is based upon and claims the benefits of priority from the prior Japanese Patent Application No. 2004-221741, filed on Jul. 29, 2004, the entire contents of which are incorporated herein by reference.

BACKGROUND OF THE INVENTION

1) Field of the Invention

The present invention relates to an image processing system, and in particular to an image processing system which performs processing for encoding and decoding image signals.

2) Description of the Related Art

In recent years, in the fields of DVD (Digital Versatile Disc) and digital TV broadcasting, the MPEG (Moving Picture Experts Group) techniques have been widely used in order to record and transmit massive amounts of image data with high quality. In the MPEG image processing, an image signal is divided into a plurality of portions, and each portion is written in and read out from a memory, and encoded or decoded.

FIG. 14 is a diagram illustrating a conventional image processing system. As illustrated in this diagram, the conventional image processing system 50 comprises an image processing unit 51 and memories 52 and 53. The image processing unit 51 is connected to the memories 52 and 53 through memory buses b1 and b2.

The image processing unit 51 performs processing for encoding and decoding image signals which are inputted into the image processing unit 51. The memories 52 and 53 store the image signals inputted into the image processing system 50 and image signals which have been processed by the image processing unit 51. At this time, the memory 52 stores image signals corresponding to the upper area (upper half) of the screen, control information related to encoding and decoding of the image signals corresponding to the upper area, and the like, and the memory 53 stores image signals corresponding to the lower area (lower half) of the screen, control information related to encoding and decoding of the image signals corresponding to the lower area, and the like.

In addition, the memories 52 and 53 have working areas for storing an OS (operating system) and data related to control of the entire system, as well as areas for storing data related to the encoding and decoding.

FIG. 15 is a diagram indicating data flow rates through the memory buses b1 and b2. In FIG. 15, the graph Ga indicates the data flow rate through the memory bus b1, and the graph Gb indicates the data flow rate through the memory bus b2. In the graphs Ga and Gb, the abscissa corresponds to time progression, and the ordinate corresponds to the data flow rate.

When image signals corresponding to the upper area of the screen are processed, the data flow rate through the memory bus b1 increases since the image signals corresponding to the upper area of the screen are stored in the memory 52. On the other hand, when image signals corresponding to the lower area of the screen are processed, the data flow rate through the memory bus b2 increases since the image signals corresponding to the lower area of the screen are stored in the memory 53.

Further, since a CPU (central processing unit) is also connected to the memory buses b1 and b2, and uses some areas of the memories 52 and 53, data stored in the working areas flow through the memory buses b1 and b2 when the CPU accesses the working areas, regardless of the processing of the image signals corresponding to the upper and lower areas of the screen.

On the other hand, in the case where data are divided into a plurality of channels and encoded, image deterioration can occur at the boundaries between data in different channels. Conventionally, a technique for preventing such image deterioration at the boundaries between data in different channels has been proposed. See, for example, Japanese Unexamined Patent Publication No. 05-183891, Paragraphs. [0013] to [0023] and FIG. 1.

SUMMARY OF THE INVENTION

According to the present invention, an image processing system for performing processing for encoding and decoding image signals is provided. The image processing system comprises an image encoder and an image decoder.

The image encoder includes an encoder-side memory, an image-input-processing unit, and an encoding unit. The encoder-side memory has a plurality of storage areas and stores data. The image-input-processing unit divides an original image into a plurality of areas so as to generate divided original images, and writes the divided original images in the encoder-side memory in a dispersed manner so that luminance data of each of the divided original images are not stored in one of the plurality of storage areas of the encoder-side memory in which chrominance data of the divided original image are stored. The encoding unit divides a reference image into a plurality of areas so as to generate divided reference images each of which includes information necessary for predictive coding of one, corresponding to the divided reference image, of luminance data sets and chrominance data sets representing the divided original images, stores each of the divided reference images in one of the plurality of storage areas of the encoder-side memory in which one of luminance data sets and chrominance data sets constituting the divided original images corresponding to the divided reference image is stored, reads image data stored in the encoder-side memory, and performs processing for encoding the image data so as to generate encoded data, when predictive coding is performed.

The image decoder includes a decoder-side memory, a decoding unit, and an image-output-processing unit. The decoder-side memory has a plurality of storage areas and stores data. The decoding unit divides and decodes encoded data so as to generate divided decoded-data sets representing a decoded image, and writes the divided decoded-data sets in the decoder-side memory in a dispersed manner so that luminance data in each of the divided decoded-data sets are not stored in one of the plurality of storage areas of the decoder-side memory in which chrominance data in the divided decoded-data set are stored. The image-output-processing unit reads the divided decoded-data sets stored in the decoder-side memory, and performs processing for outputting the decoded image.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIGS. 7A and 7B are diagrams illustrating the memory sizes of chrominance components of reference-image data stored in memories;

FIG. 13 is a diagram illustrating a parallel arrangement of three memories;

DESCRIPTION OF THE PREFERRED EMBODIMENTS

Normally, when processing for encoding information on images having a large screen size, such as the images in accordance with MP@HL (Main Profile@High Level), is performed, the amount of accessed data in a memory (i.e., the load imposed on the memory) increases in proportion to the screen size. Therefore, conventionally, a plurality of memories are arranged in order to distribute load among the memories (i.e., reduce the load imposed on each memory).

Figure 14:
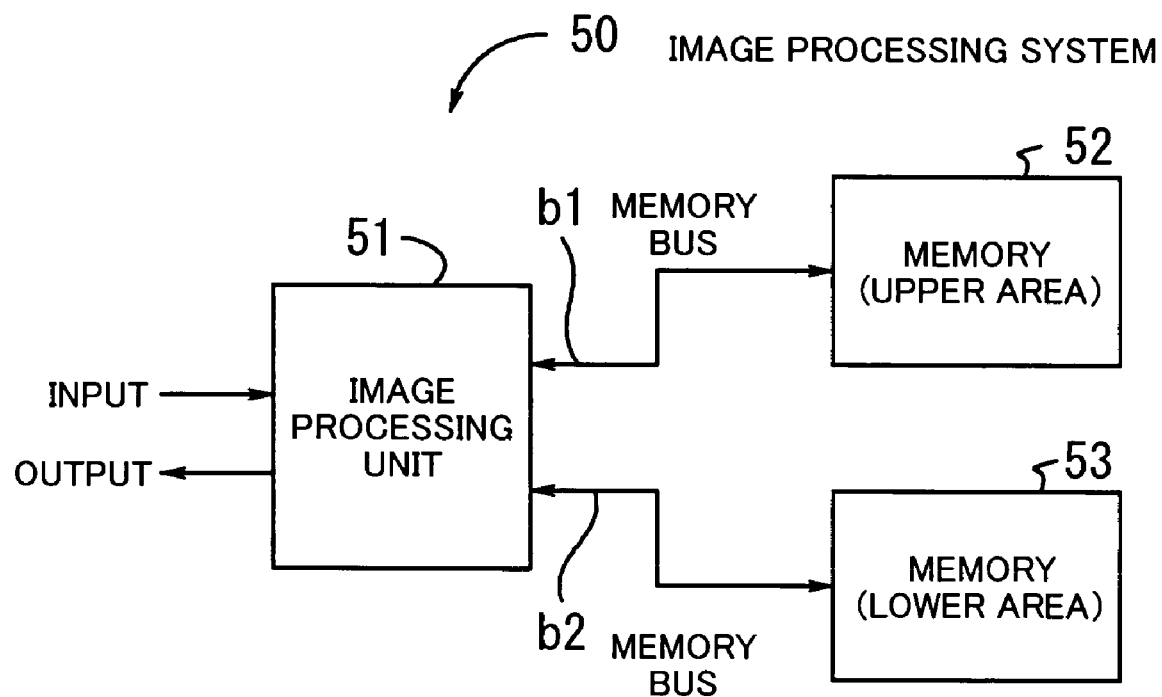
FIG. 14 is a diagram illustrating a conventional image processing system.
Figure 15:
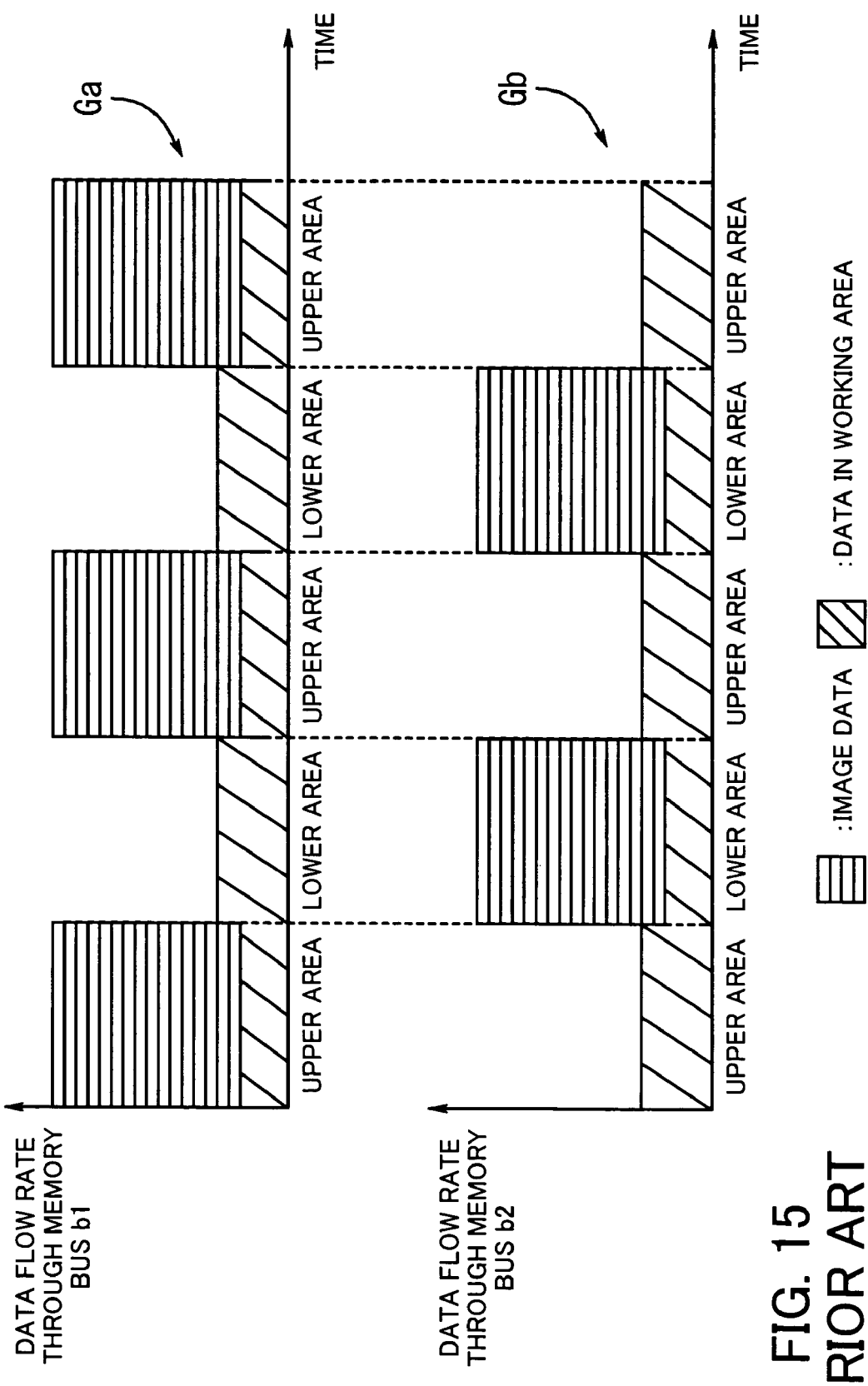
FIG. 15 is a diagram indicating data flow rates through the memory buses.

However, in the system where image data corresponding to the upper area of the screen are stored in the memory 52, and image data corresponding to the lower area of the screen are stored in the memory 53, as in the conventional system of FIG. 14, the load imposed on the memory 52 increases when image processing of the upper area is performed, and the load imposed on the memory 53 increases when image processing of the lower area is performed, as illustrated in FIG. 15. Therefore, the load imposed on the memories is unbalanced. That is, according to the conventional control, even when the number of the memories is increased, optimum load distribution is not realized, and therefore the efficiency in memory access is low.

For example, as indicated in FIG. 15, the image processing of the upper area of the screen puts pressure on the data processing performed on the working area in the memory 52 during the image processing of the upper area, and the image processing of the lower area of the screen puts pressure on the data processing performed on the working area in the memory 53 during the image processing of the lower area. That is, optimum load distribution is not realized.

The present invention is made in view of the above problems, and the object of the present invention is to provide an image processing system which efficiently balances the load among memories, and improves the efficiency in memory access.

Embodiments of the present invention are explained below with reference to drawings.

Figure 1:
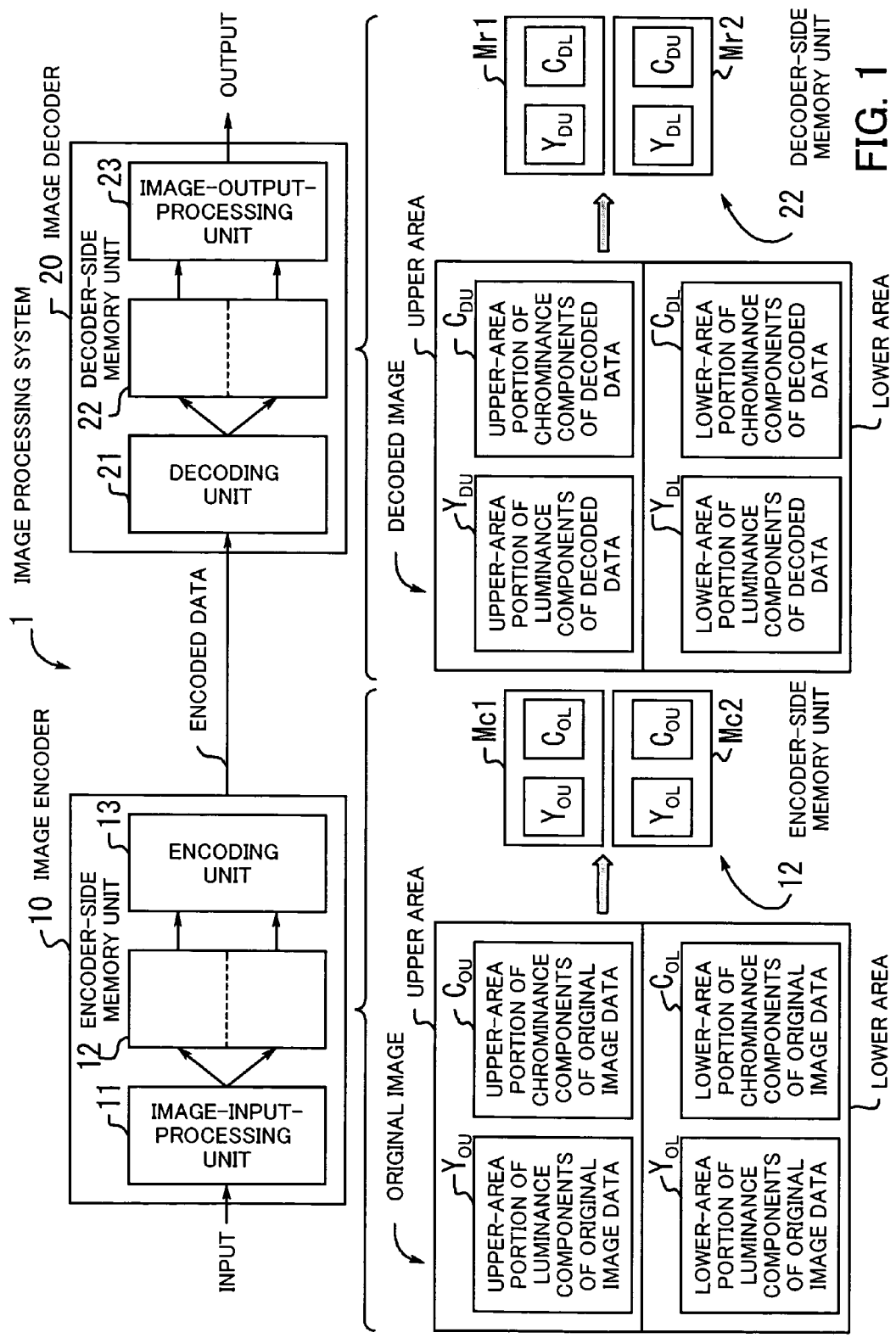
FIG. 1 is a diagram illustrating the principle of an image processing system according to the present invention.

FIG. 1 is a diagram illustrating an operational principle of the image processing system according to the present invention. As illustrated in FIG. 1, the image processing system 1 according to the present invention comprises an image encoder 10 and an image decoder 20, and performs processing for encoding and decoding image signals.

The image encoder 10 comprises an image-input-processing unit 11, an encoder-side memory unit 12, and an encoding unit 13, where the encoder-side memory unit 12 has a plurality of storage areas for storing data.

The image-input-processing unit 11 divides an inputted original image into a plurality of areas so as to generate divided original images. In addition, in order to prevent concentration of access to a specific one of the storage areas in the encoder-side memory unit 12, the image-input-processing unit 11 writes the divided original images in the encoder-side memory unit 12 in a dispersed manner so that luminance data of each of the divided original images are not stored in one of the plurality of storage areas of the encoder-side memory unit 12 in which chrominance data of the divided original image are stored.

The encoding unit 13 divides a reference image into a plurality of areas so as to generate divided reference images each of which includes information necessary for predictive coding of one, corresponding to the divided reference image, of luminance data sets and chrominance data sets representing the divided original images. In addition, the encoding unit 13 stores each of the divided reference images in one of the plurality of storage areas of the encoder-side memory in which one of luminance data sets and chrominance data sets constituting the divided original images corresponding to the divided reference image is stored, reads image data stored in the encoder-side memory, and performs processing for encoding the image data so as to generate encoded data.

The image decoder 20 comprises a decoding unit 21, a decoder-side memory unit 22, and an image-output-processing unit 23, where the decoder-side memory unit 22 has a plurality of storage areas for storing data.

The decoding unit 21 divides and decodes inputted encoded data so as to generate divided decoded-data sets representing a decoded image. In addition, in order to prevent concentration of access to a specific one of the storage areas in the decoder-side memory unit 22, the decoding unit 21 writes the divided decoded-data sets in the decoder-side memory unit 22 in a dispersed manner so that luminance data in each of the divided decoded-data sets are not stored in one of the plurality of storage areas of the decoder-side memory unit 22 in which chrominance data in the divided decoded-data set are stored. The image-output-processing unit 23 reads the divided decoded-data sets stored in the decoder-side memory, and performs processing for outputting the decoded image.

The operations of storing data in the memories illustrated in FIG. 1 are explained below.

The encoder-side memory unit 12 is constituted by two storage areas Mc1 and Mc2. The image-input-processing unit 11 divides the luminance components of the data of the original image (original image data) into an upper-area portion corresponding to the upper area (upper half) of the screen and a lower-area portion corresponding to the lower area (lower half) of the screen, and also divides the chrominance components of the original image data into an upper-area portion corresponding to the upper area (upper half) of the screen and a lower-area portion corresponding to the lower area (lower half) of the screen.

The image-input-processing unit 11 stores the upper-area portion $Y_{OU}$ of the luminance components and the lower-area portion $C_{OL}$ of the chrominance components of the original image data as data of a divided original image in the storage area Mc1, and the lower-area portion $Y_{OL}$ of the luminance components and the upper-area portion $C_{OU}$ of the chrominance components of the original image data as data of a divided original image in the storage area Mc2. The operations of storing the reference image data in the memories in the case where predictive coding are performed is explained later.

On the other hand, the decoder-side memory unit 22 is constituted by two storage areas Mr1 and Mr2. The decoding unit 21 divides the luminance components of data of a decoded image (decoded image data) into an upper-area portion corresponding to the upper area (upper half) of the screen and a lower-area portion corresponding to the lower area (lower half) of the screen, and also divides the chrominance components of the decoded image data into an upper-area (upper half) portion corresponding to the upper area of the screen and a lower-area portion corresponding to the lower area (lower half) of the screen.

The decoder-side memory unit 22 stores the upper-area portion $Y_{DU}$ of the luminance components and the lower-area portion $C_{DL}$ of the chrominance components of the decoded image data as data of a divided, decoded image in the storage area Mr1, and the lower-area portion $Y_{DL}$ of the luminance components and the upper-area portion $C_{DU}$ of the chrominance components of the decoded image data as data of a divided, decoded image in the storage area Mr2.

That is, according to the present invention, the image signals are divided into luminance signals and chrominance signals, one storage area stores luminance data of the upper area and chrominance data of the lower area, and the other storage area stores luminance data of the lower area and chrominance data of the upper area, while, in the conventional system, each storage area stores image data of only the upper area or only the lower area.

Thus, access does not concentrate in one storage area during processing of either the upper area or the lower area, and the load of memory access is balanced.

Figure 2:
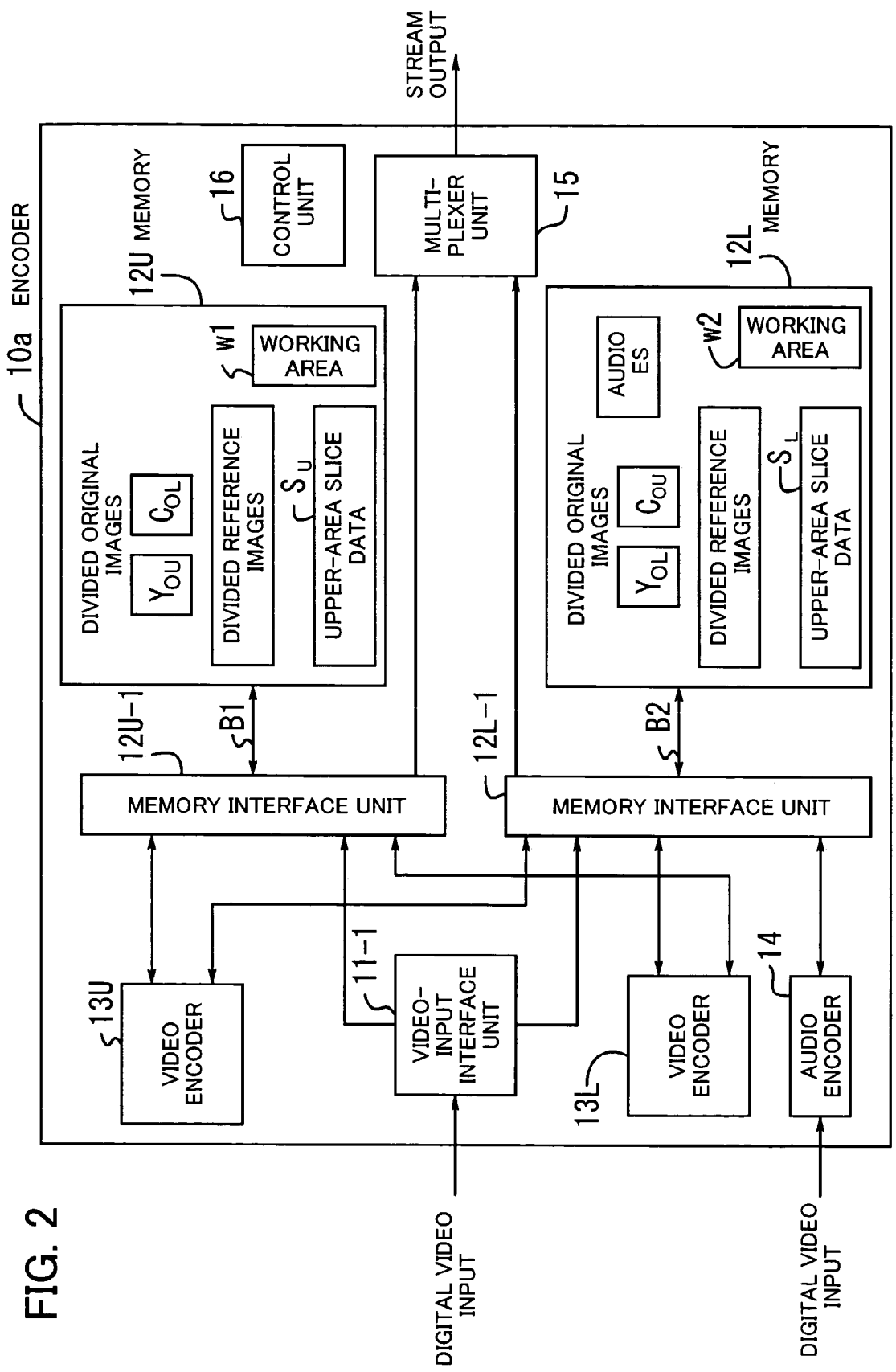
FIG. 2 is a diagram illustrating a construction of an encoder.

Next, details of the construction and the operations of the image encoder 10 are explained below. FIG. 2 is a diagram illustrating a construction of an encoder 10a, which is a concrete example of the image encoder 10.

The encoder 10a comprises a video-input interface unit 11-1, memory interface units 12U-1 and 12L-1, memories 12U and 12L, video encoders 13U and 13L, an audio encoder 14, a multiplexer unit 15, and a control unit 16.

The video-input interface unit 11-1 realizes the image-input-processing unit 11, the memory interface units 12U-1 and 12L-1 and the memories 12U and 12L realize the encoder-side memory unit 12, and the video encoders 13U and 13L realize the encoding unit 13.

The encoder 10a performs processing for encoding an inputted digital image (1440×1080i) in accordance with MP@HL (MPEG2), and processing for encoding an inputted digital sound (16 bits×2 channels) in accordance with the MPEG2-Audio standard, where "1440×1080i" indicates that the number of pixels in the horizontal direction is 1440, the number of pixels in the vertical direction is 1080, and the image is interlaced. Then, the encoder 10a multiplexes the encoded video data and the encoded audio data, and outputs the multiplexed data.

In order to perform the processing for encoding video data at high speed, two video encoders 13U and 13L are provided, and the processing for encoding video data is performed in parallel. The memories 12U and 12L are realized by, for example, SDRAMs (Synchronous Dynamic RAMs). The control unit 16 controls all the function blocks in the encoder 10a.

The video-input interface unit 11-1 performs necessary filtering operations on an 8-bit parallel digital input signal (1440×1080i) in accordance with the D1 format, which is inputted from outside on a real-time basis, and generates an original image in the 4:2:0 format, where the D1 format is an image format used by the broadcasting industry.

In addition, the video-input interface unit 11-1 writes the upper-area portion $Y_{OU}$ of the luminance components of the original image data through the memory interface unit 12U-1 in the memory 12U, and the lower-area portion $Y_{OL}$ of the luminance components of the original image data through the memory interface unit 12L-1 in the memory 12L.

Further, the video-input interface unit 11-1 writes the upper-area portion $C_{OU}$ of the chrominance components of the original image data through the memory interface unit 12L-1 in the memory 12L, and the lower-area portion $C_{OL}$ of the chrominance components of the original image data through the memory interface unit 12U-1 in the memory 12U.

The memory interface unit 12U-1 is connected to the memory 12U through the memory bus B1, performs arbitration among requests for access to the memory 12U, and behaves as an access interface between the memory 12U and the other function blocks in the encoder 10a. The memory interface unit 12L-1 is connected to the memory 12L through the memory bus B2, performs arbitration among requests for access to the memory 12L, and behaves as an access interface between the memory 12L and the other function blocks in the encoder 10a.

The video encoder 13U performs processing for encoding the original image data stored in the memories 12U and 12L in accordance with MP@HL, generates slice data $S_U$ for the upper area, and stores the slice data Su in the memory 12U. Since the I, P, and B pictures are used according to MP@HL, the video encoder 13U performs processing for intra- and inter-frame encoding. In addition, when predictive coding is performed, reference image data for the upper area are stored in the memories 12U and 12L as explained later with reference to FIGS. 4 to 7.

The video encoder 13L performs processing for encoding the original image data stored in the memories 12U and 12L in accordance with MP@HL, generates slice data $S_L$ for the lower area, and stores the slice data $S_L$ in the memory 12L. In addition, when predictive coding is performed, reference image data for the lower area are stored in the memories 12U and 12L as explained later with reference to FIGS. 4 to 7.

The audio encoder 14 performs processing for encoding digital sound which is inputted from outside, and stores encoded audio ESs (Elementary Streams) in the memory 12L.

The multiplexer unit 15 multiplexes the slice data $S_U$ for the upper area, the slice data $S_L$ for the lower area, the encoded audio ESs, and necessary header information, and generates and outputs MPEG2 system streams.

Further, the memories 12U and 12L respectively include working areas w1 and w2 for storing an OS (operating system) and data related to control of the entire system, as well as the areas for storing data related to the encoding.

Figure 3:
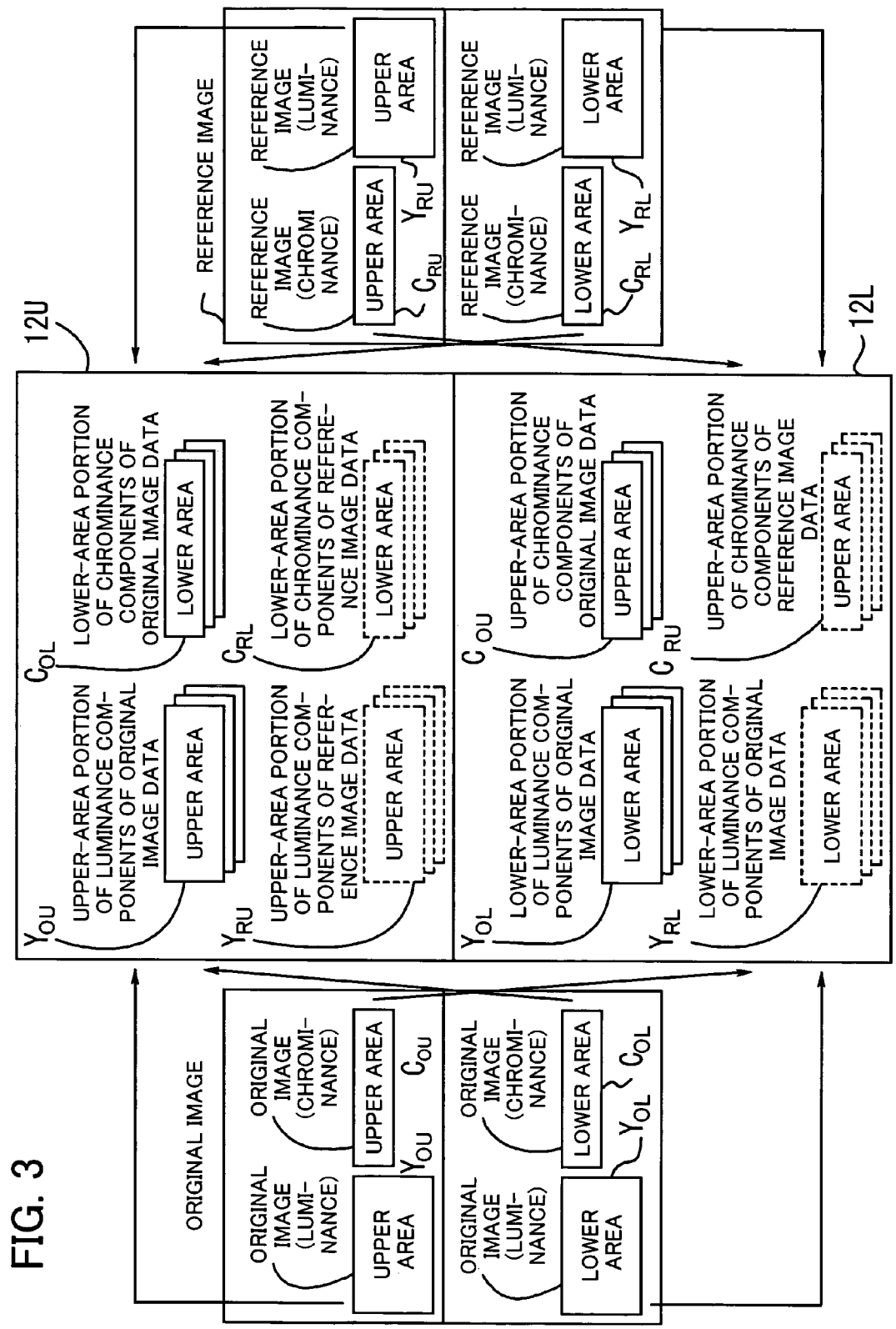
FIG. 3 is a diagram illustrating storage of image data in memories.

Next, the operations of storing image data in the memories 12U and 12L are explained below. FIG. 3 is a diagram illustrating storage of image data in the memories 12U and 12L. For clarification, the original image data are indicated by solid lines, and the reference image data are indicated by dashed lines. In the following explanations, the operations of storing the data in the working areas w1 and w2, the audio ESs, the slice data, and the like are not shown.

The video-input interface unit 11-1 divides the luminance components of the original image data into an upper-area portion and a lower-area portion so as to generate the upper-area portion $Y_{OU}$ of the luminance components of the original image data and the lower-area portion $Y_{OL}$ of the luminance components of the original image data, and also divides the chrominance components of the original image data into an upper-area portion and a lower-area portion so as to generate the upper-area portion $C_{OU}$ of the chrominance components of the original image data and the lower-area portion $C_{OL}$ of the chrominance components of the original image data.

The memory 12U stores the upper-area portion $Y_{OU}$ of the luminance components of the original image data and the lower-area portion $C_{OL}$ of the chrominance components of the original image data, and the memory 12L stores the lower-area portion $Y_{OL}$ of the luminance components of the original image data and the upper-area portion $C_{OU}$ of the chrominance components of the original image data.

When predictive coding is performed, the video encoder 13U accesses the memories 12U and 12L through the memory interface units 12U-1 and 12L-1, reads the upper-area portion $Y_{OU}$ of the luminance components of the original image data and the upper-area portion $C_{OU}$ of the chrominance components of the original image data, and generates the upper-area portion $Y_{RU}$ of the luminance components of the reference image data and the upper-area portion $C_{RU}$ of the chrominance components of the reference image data respectively corresponding to the upper-area portion $Y_{OU}$ of the luminance components of the original image data and the upper-area portion $C_{OU}$ of the chrominance components of the original image data.

In addition, when predictive coding is performed, the video encoder 13L also accesses the memories 12U and 12L through the memory interface units 12U-1 and 12L-1, reads the lower-area portion $Y_{OL}$ of the luminance components of the original image data and the lower-area portion $C_{OL}$ of the chrominance components of the original image data, and generates the lower-area portion $Y_{RL}$ of the luminance components of the reference image data and the lower-area portion $C_{RL}$ of the chrominance components of the reference image data respectively corresponding to the lower-area portion $Y_{OL}$ of the luminance components of the original image data and the lower-area portion $C_{OL}$ of the chrominance components of the original image data.

The memory 12U further stores the upper-area portion $Y_{RU}$ of the luminance components of the reference image data and the lower-area portion $C_{RL}$ of the chrominance components of the reference image data, and the memory 12L further stores the lower-area portion $Y_{RL}$ of the luminance components of the reference image data and the upper-area portion $C_{RU}$ of the chrominance components of the reference image data.

Since the encoder 10a handles interlaced images, in practice, image data of the top field and the bottom field are separately stored in the memories as explained later with reference to FIG. 8.

Figure 4:
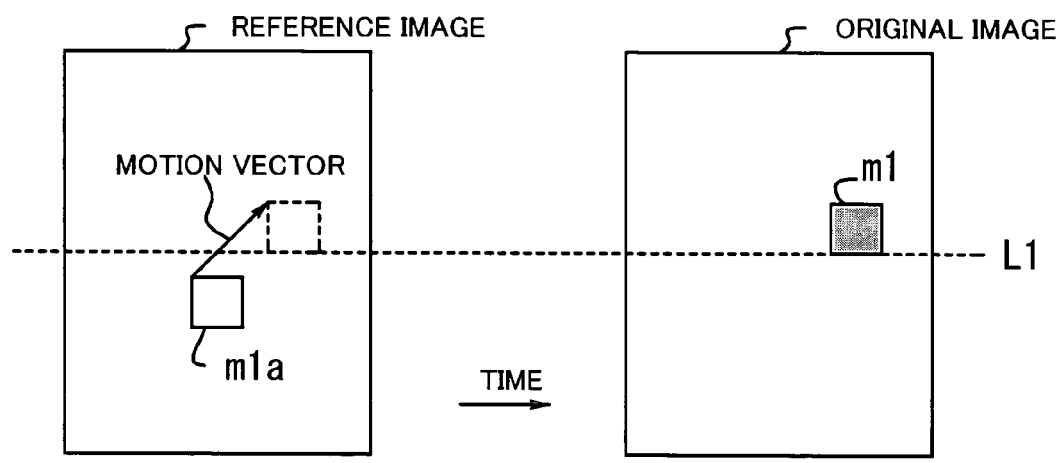
FIG. 4 is a diagram illustrating an operation of predictive coding.

Next, the operations of storing reference image data in memories are explained below. FIG. 4 is a diagram illustrating an operation of predictive coding. When predictive coding is performed, estimation processing for searching a reference image for similar pixels to the pixels of a macroblock of an original image is performed, the values of the pixels shifted in correspondence with the movement from the similar pixels of the reference image to the pixels of the macroblock of the original image are determined to be predicted values, and a motion vector of the macroblock is obtained.

Consider detection of a motion vector of a macroblock m1 located near the line L1 which divides the original image into the upper area and the lower area. An area of the reference image around the macroblock (indicated by dashed lines in FIG. 4) located in correspondence with the macroblock m1 is compared with the macroblock m1. For example, when the macroblock m1a (indicated under the dividing line L1 in FIG. 4) has a pattern most similar to the pattern which the macroblock m1 has, the motion vector indicated by the arrow in FIG. 4 is detected.

Figure 5:
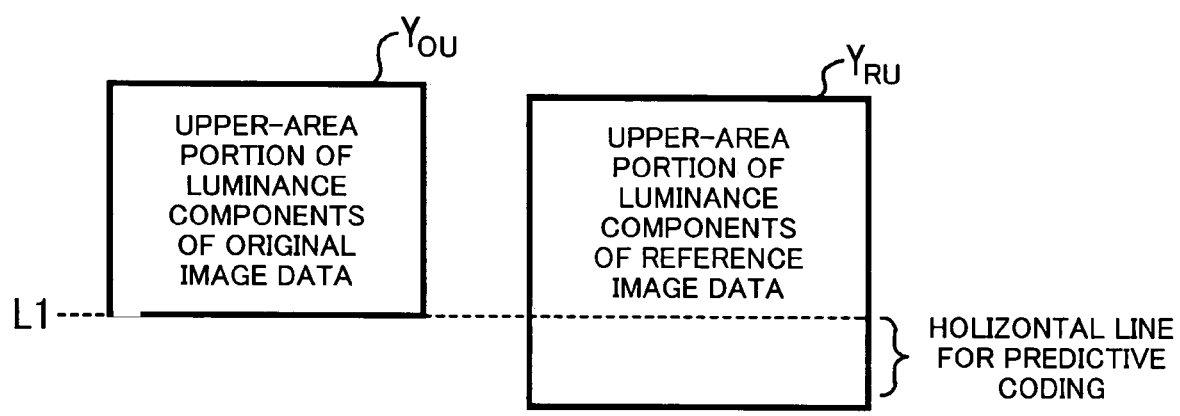
FIG. 5 is a diagram illustrating the size of an upper-area portion $Y_{RU}$ of luminance components of reference image data stored in a memory.

FIG. 5 is a diagram illustrating the size of the upper-area portion $Y_{RU}$ of the luminance components of the reference image data stored in a memory. As in the above example, when a motion vector of a macroblock m1 located near the dividing line L1 in the upper area is detected, the macroblock m1a which has pixel values nearest to the pixel values of the macroblock m1 can be located in the lower area.

In preparation for the above situation, a reference image which is necessary for detection of motion vectors based on the upper-area portion $Y_{OU}$ of the luminance components of the original image data extends beyond the dividing line L1 to a portion of the lower area so as to include at least one horizontal line in the lower area which is necessary for predictive coding. That is, the size of the upper-area portion $Y_{RU}$ of the luminance components of the reference image data is increased beyond the size of the upper-area portion $Y_{OU}$ of the luminance components of the corresponding original image data by the at least one horizontal line in the lower area which is necessary for predictive coding. The upper-area portion $Y_{RU}$ of the luminance components of the reference image data is stored in the same storage area as the upper-area portion $Y_{OU}$ of the luminance components of the original image data.

Figure 6:
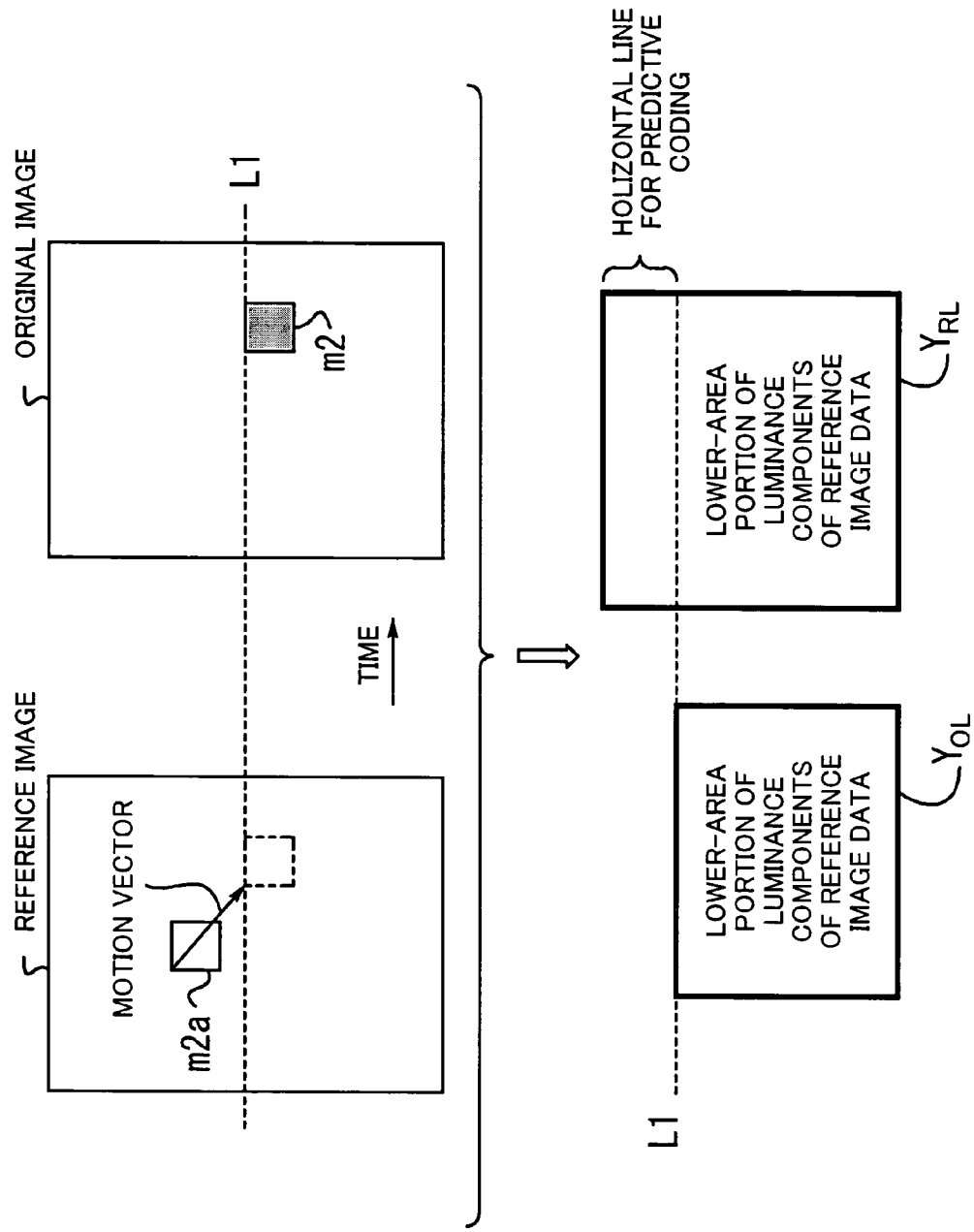
FIG. 6 is a diagram illustrating the size of a lower-area portion $Y_{RL}$ of luminance components of reference image data stored in a memory.

FIG. 6 is a diagram illustrating the size of the lower-area portion $Y_{RL}$ of the luminance components of the reference image data stored in a memory. As in the case of FIG. 5, when a motion vector of a macroblock m2 located near the dividing line L1 in the lower area is detected, the macroblock m2a which has pixel values nearest to the pixel values of the macroblock m2 can be located in the upper area.

In preparation for the above situation, a reference image which is necessary for detection of motion vectors based on the lower-area portion $Y_{OL}$ of the luminance components of the original image data extends beyond the dividing line L1 to a portion of the upper area so as to include at least one horizontal line in the upper area which is necessary for predictive coding. That is, the size of the lower-area portion $Y_{RL}$ of the luminance components of the reference image data is increased beyond the size of the lower-area portion $Y_{OL}$ of the luminance components of the corresponding original image data by the at least one horizontal line in the upper area which is necessary for predictive coding. The lower-area portion $Y_{RL}$ of the luminance components of the reference image data is stored in the same storage area as the lower-area portion $Y_{OL}$ of the luminance components of the original image data.

FIGS. 7A and 7B are diagrams illustrating the sizes of chrominance components of reference-image data stored in memories. When motion vectors are detected for the chrominance components, the sizes of the upper-area portion $C_{RU}$ and the lower-area portion $C_{RL}$ of the chrominance components of the reference image data stored in memories are also increased as in the cases of the luminance components. That is, the size of the upper-area portion $C_{RU}$ of the chrominance components of the reference image data is increased beyond the size of the upper-area portion $C_{OU}$ of the chrominance components of the corresponding original image data by at least one horizontal line in the lower area which is necessary for predictive coding, and the size of the lower-area portion $C_{RL}$ of the chrominance components of the reference image data is increased beyond the size of the lower-area portion $C_{OL}$ of the chrominance components of the corresponding original image data by at least one horizontal line in the upper area which is necessary for predictive coding.

Figure 8:
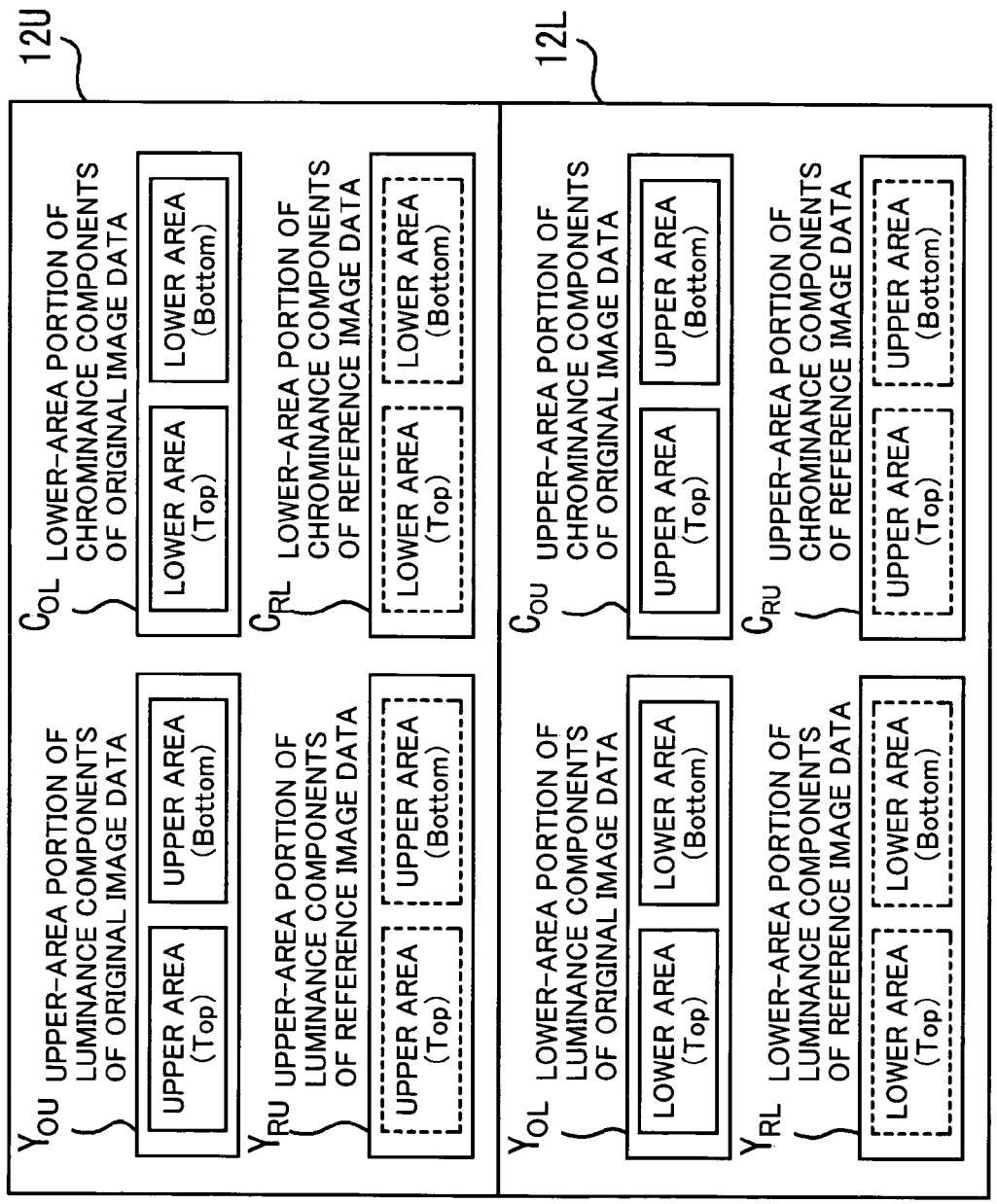
FIG. 8 is a diagram illustrating storage of interlaced images in memories.

FIG. 8 is a diagram illustrating storage of interlaced images in memories. In the case of interlaced images, image data of the top field and the bottom field are separately stored in the memories, where the image data of each of the top field and the bottom field are stored as explained with reference to FIGS. 4 to 7B. Therefore, the storing operations are not explained again. (In the case of progressive images, image data are stored on a frame-by-frame basis.)

Figure 9:
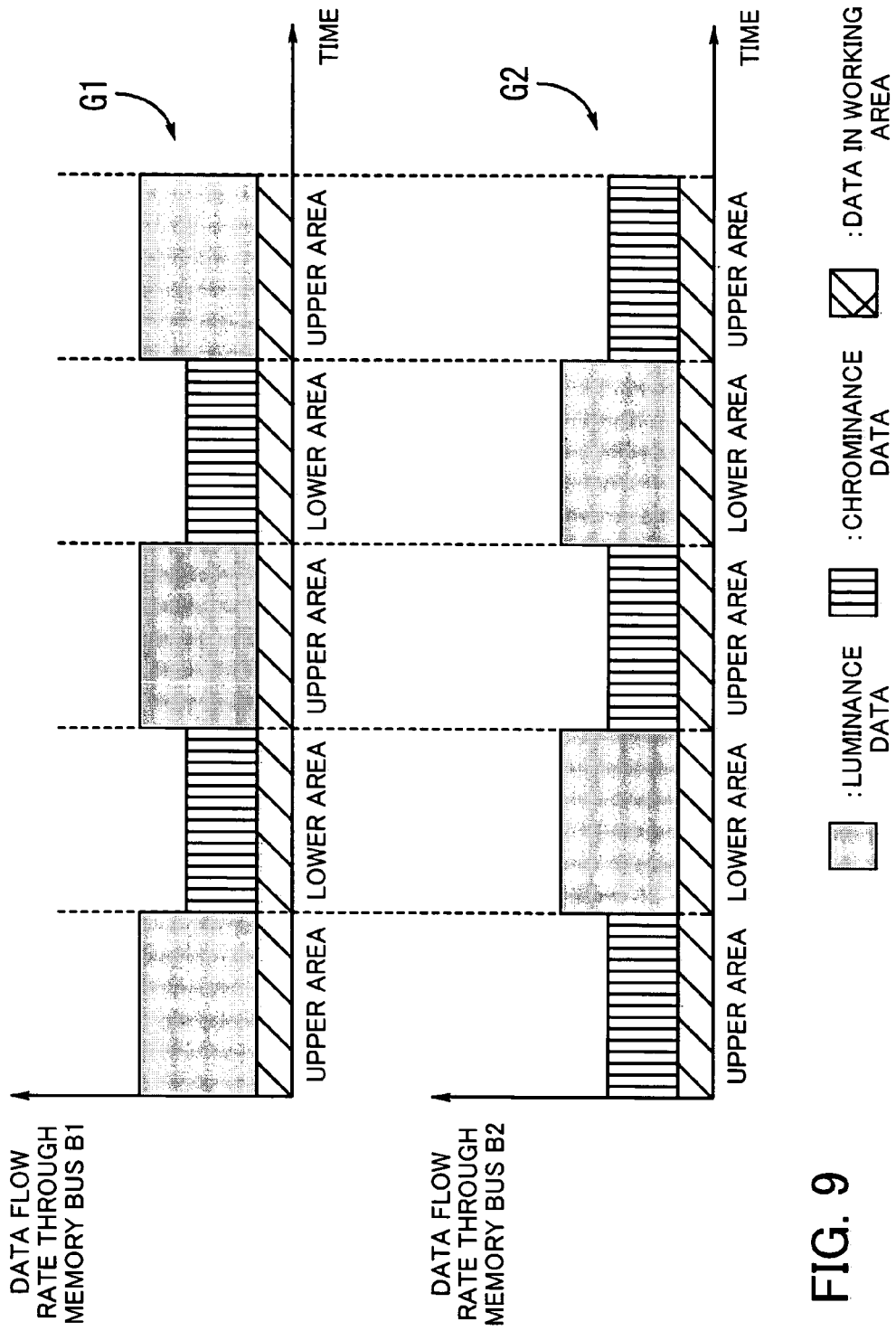
FIG. 9 is a diagram illustrating data flow rates through memory buses.

Next, the data flow rates through the memory buses B1 and B2 are explained below. FIG. 9 is a diagram illustrating the data flow rates through the memory buses B1 and B2. In FIG. 9, G1 represents a graph indicating the data flow rate through the memory bus B1, and G2 represents a graph indicating the data flow rate through the memory bus B2. In each graph, the ordinate corresponds to the data flow rate, and the abscissa corresponds to progression of time.

The memories in the encoder 10a are accessed as follows. That is, during processing of the upper area, the memory 12U is accessed for reading luminance data of the upper area from the memory 12U or writing luminance data of the upper area in the memory 12U, and the memory 12L is accessed for reading chrominance data of the upper area from the memory 12L or writing chrominance data of the upper area in the memory 12L. On the other hand, during processing of the lower area, the memory 12U is accessed for reading chrominance data of the lower area from the memory 12U or writing chrominance data of the lower area in the memory 12U, and the memory 12L is accessed for reading luminance data of the lower area from the memory 12L or writing luminance data of the lower area in the memory 12L. That is, during processing of the upper area, luminance data flow through the memory bus B1, and chrominance data flow through the memory bus B2. On the other hand, during processing of the lower area, chrominance data flow through the memory bus B1, and luminance data flow through the memory bus B2. Therefore, the load is balanced, compared with the conventional system illustrated in FIG. 15.

Further, since the load imposed on the memories are balanced, the processing for encoding image data does not put pressure on the processing of data stored in the working areas in the memories 12U and 12L, and the data flow rates can be almost constant during the processing for encoding image data of the upper area and the lower area.

When the encoder 10a performs encoding of I pictures (intra-coded pictures), the reference images are unnecessary. In addition, when the encoder 10a performs encoding of P pictures (predictive-coded pictures), the reference images as illustrated in FIGS. 5 and 6 are used for the encoding, since P pictures are generated by prediction based on I or P pictures. Further, when the encoder 10a performs encoding of B pictures (bidirectionally predictive-coded pictures), the reference images generated based on I or P pictures as illustrated in FIGS. 5 and 6 are used for the encoding, since B pictures are generated by prediction based on I or P pictures located on the forward and backward sides.

Figure 10:
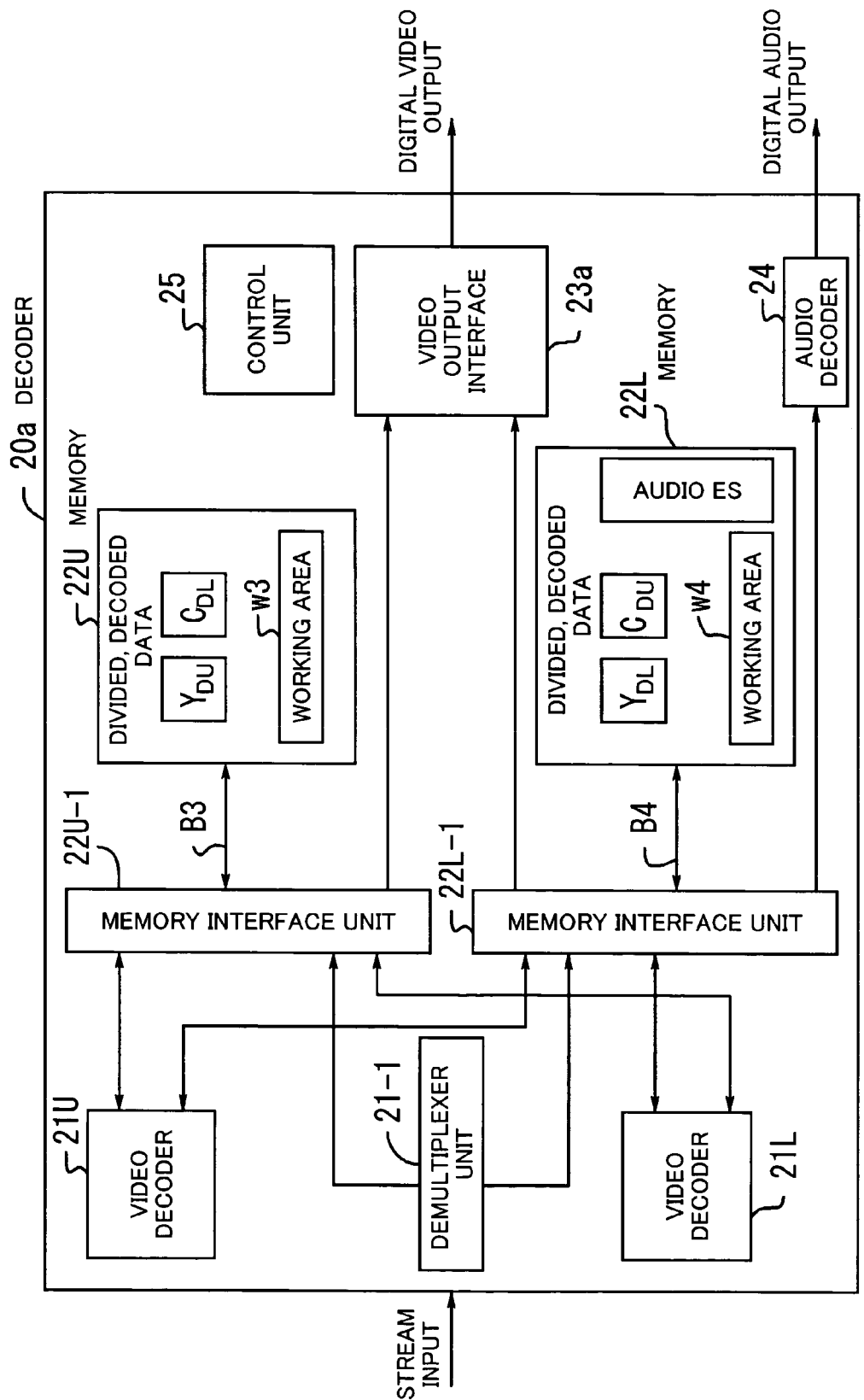
FIG. 10 is a diagram illustrating a construction of a decoder.

Hereinbelow, details of a construction and operations of a concrete example of the image decoder 20 are explained. FIG. 10 is a diagram illustrating a construction of a decoder 20a as a concrete example of the image decoder 20. The decoder 20a comprises a demultiplexer unit 21-1, video decoders 21U and 21L, memory interface units 22U-1 and 22L-1, memories 22U and 22L, a video output interface 23a, an audio decoder 24, and a control unit 25.

The demultiplexer unit 21-1 and the video decoders 21U and 21L realize the aforementioned decoding unit 21, the memory interface units 22U-1 and 22L-1 and the memories 22U and 22L realize the aforementioned decoder-side memory unit 22, and the video output interface 23a realizes the aforementioned image-output-processing unit 23.

The decoder 20a decodes streams (e.g., MPEG-2 System, MPEG-2 MP@HL, MPEG-2 audio, and the like) inputted thereto, and outputs a digital video output signal (8-bit parallel digital output signal in the format 1440×1080i) and a digital audio output signal (16-bit stereo 2-ch).

In order to increase the speed of the processing for decoding video signals, the two video decoders 21U and 21L are provided, and the processing for decoding is performed in parallel. In the memories 22U and 22L, for example, SRAMs are used. The control unit 25 controls all of the function blocks in the decoder 20a.

The demultiplexer unit 21-1 separates video ESs and audio ESs from the streams inputted from outside, and temporarily stores the video ESs and audio ESs in the memories 22U and 22L through the memory interface units 22U-1 and 22L-1.

The video decoder 21U decodes upper-area portions of the video ESs, generates data of decoded images of the upper area in the 4:2:0 format, writes the upper-area portions $Y_{DU}$ of the luminance components of the decoded image data in the memory 22U through the memory interface unit 22U-1, and writes the upper-area portions $C_{DU}$ of the chrominance components of the decoded image data in the memory 22L through the memory interface unit 22L-1.

The video decoder 21L decodes lower-area portions of the video ESs, generates data of decoded images of the lower area in the 4:2:0 format, writes the lower-area portions $Y_{DL}$ of the luminance components of the decoded image data in the memory 22L through the memory interface unit 22L-1, and writes the lower-area portions $C_{DU}$ of the chrominance components of the decoded image data in the memory 22U through the memory interface unit 22U-1.

The memory interface unit 22U-1 is connected to the memory 22U through the memory bus B3, performs arbitration among requests for access to the memory 22U, and behaves as an access interface between the memory 22U and the other function blocks in the decoder 20a.

The memory interface unit 22L-1 is connected to the memory 22L through the memory bus B4, performs arbitration among requests for access to the memory 22L, and behaves as an access interface between the memory 22L and the other function blocks in the decoder 20a.

The video output interface 23a performs processing for format conversion (e.g., 4:2:0->4:2:2) of the decoded image data stored in the memories 22U and 22L, and outputs from the decoder 20a a digital video output (an 8-bit parallel digital output signal (1440×1080i) in accordance with the D1 format) on a real-time basis. The audio decoder 24 decodes the audio ESs, and outputs from the decoder 20a a digital audio output signal (16-bit stereo 2-ch).

In addition, the memories 22U and 22L respectively include working areas w3 and w4 for storing an OS (operating system) and data related to control of the entire system, as well as the areas for storing data related to the decoding.

Figure 11:
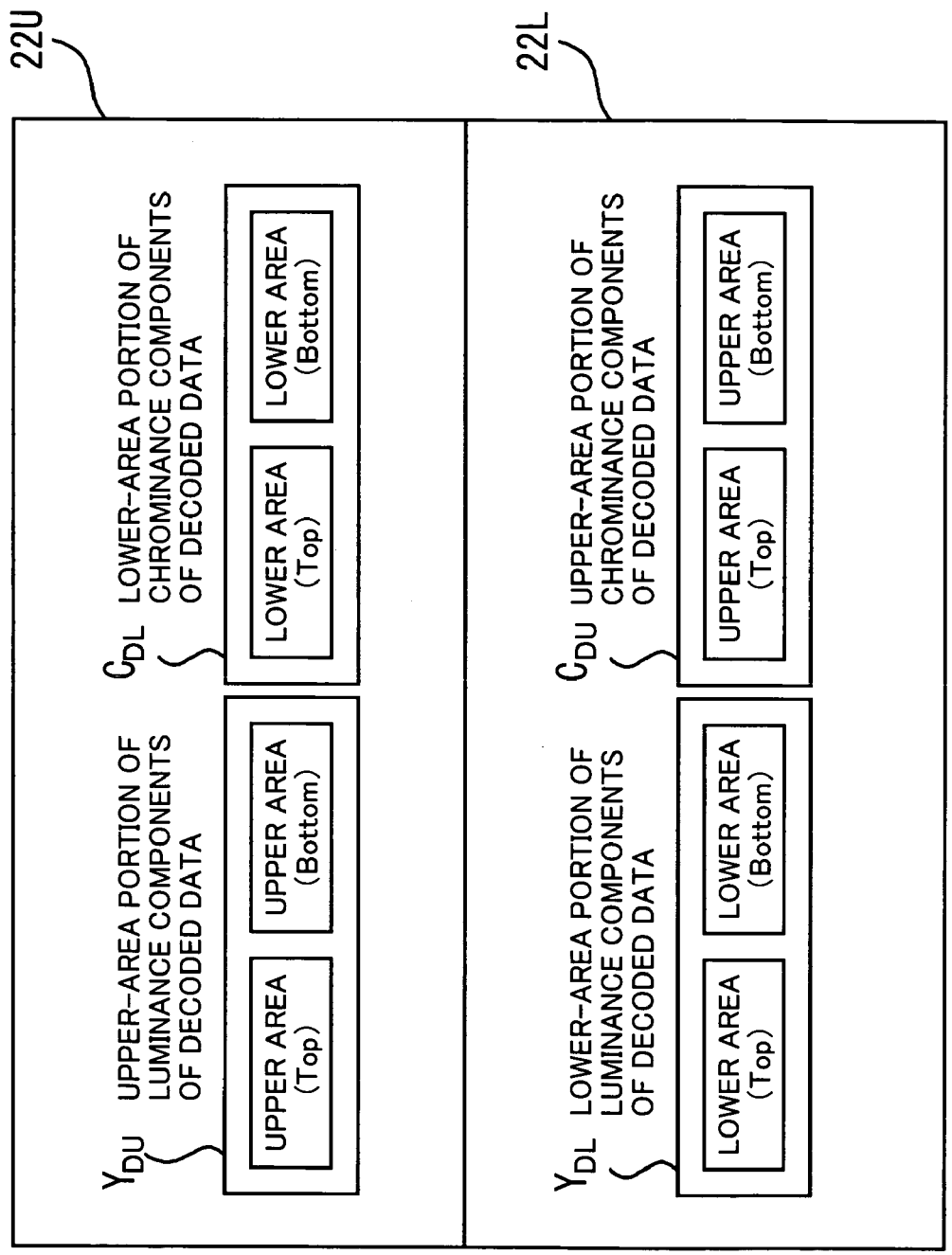
FIG. 11 is a diagram illustrating storage of image data in memories.

FIG. 11 is a diagram illustrating storage of image data in the memories 22U and 22L. Since the decoder 20a handles interlaced images, image data of the top field and the bottom field are separately stored in the memories, as illustrated in FIG. 11. In the following explanations, the operations of storing the data in the working areas w3 and w4, the audio ESs, and the like are not shown.

The video decoder 21U decodes the upper-area portions of encoded image data inputted thereto, and generates the upper-area portions $Y_{DU}$ of the luminance components of the decoded image data and the upper-area portions $C_{DU}$ of the chrominance components of the decoded image data. On the other hand, the video decoder 21L decodes the lower-area portions of encoded image data inputted thereto, and generates the lower-area portions $Y_{DL}$ of the luminance components of the decoded image data and the lower-area portions $C_{DL}$ of the chrominance components of the decoded image data.

The memory 22U stores the upper-area portions $Y_{DU}$ of the luminance components of the decoded image data and the lower-area portions $C_{DL}$ of the chrominance components of the decoded image data, and the memory 22L stores the lower-area portions $Y_{DL}$ of the luminance components of the decoded image data and the upper-area portions $C_{DU}$ of the chrominance components of the decoded image data.

Figure 12:
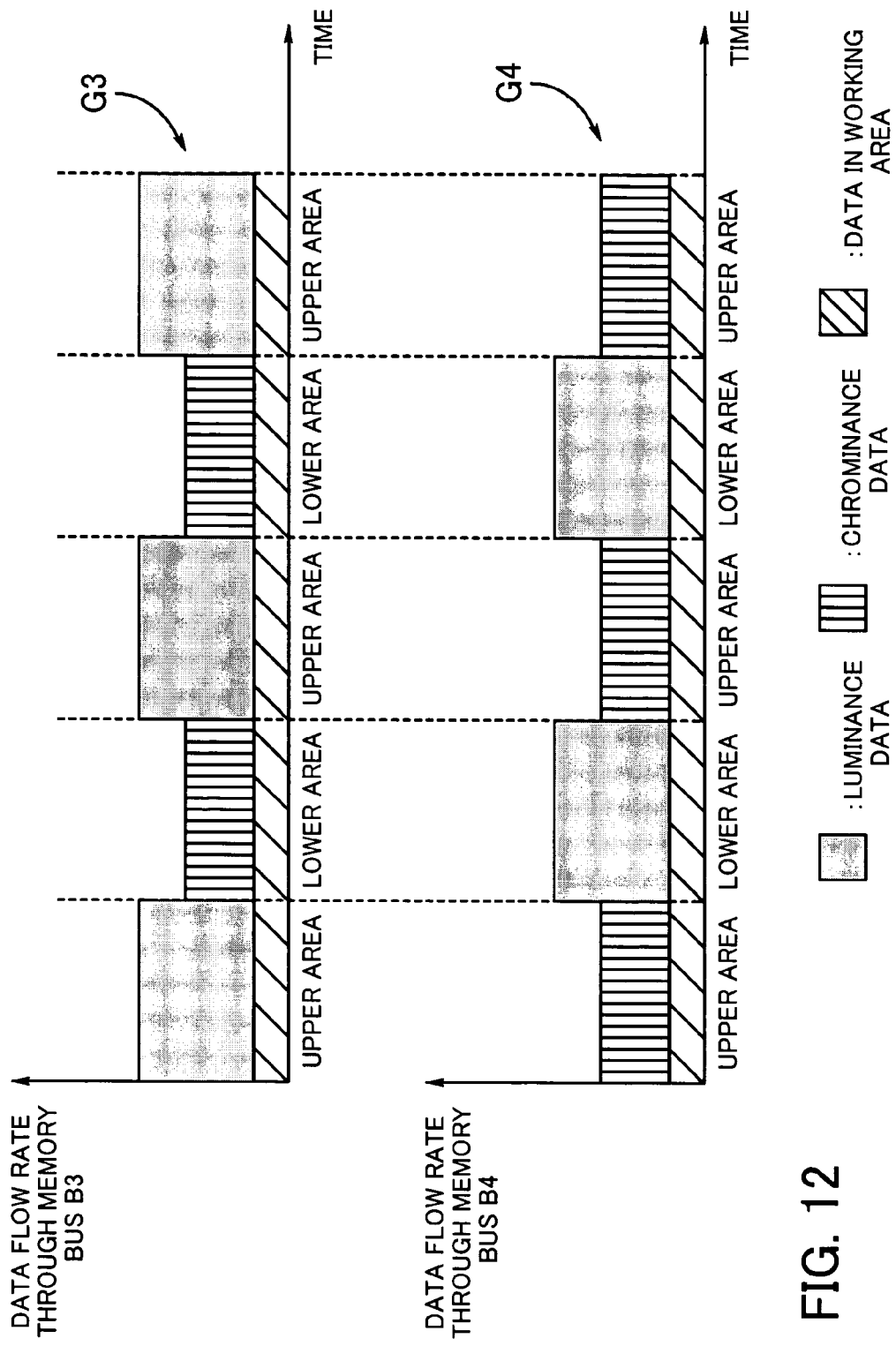
FIG. 12 is a diagram illustrating data flow rates through memory buses.

Next, the data flow rates through the memory buses B3 and B4 are explained below. FIG. 12 is a diagram illustrating the data flow rates through the memory buses B3 and B4. In FIG. 12, G3 represents a graph indicating the data flow rate through the memory bus B3, and G4 represents a graph indicating the data flow rate through the memory bus B4. In each graph, the ordinate corresponds to the data flow rate, and the abscissa corresponds to progression of time.

The memories in the decoder 20a are accessed as follows. That is, during processing of the upper area, the memory 22U is accessed for reading decoded luminance data of the upper area from the memory 22U or writing decoded luminance data of the upper area in the memory 22U, and the memory 22L is accessed for reading decoded chrominance data of the upper area from the memory 22L or writing decoded chrominance data of the upper area in the memory 22L. On the other hand, during processing of the lower area, the memory 22U is accessed for reading decoded chrominance data of the lower area from the memory 22U or writing decoded chrominance data of the lower area in the memory 22U, and the memory 22L is accessed for reading decoded luminance data of the lower area from the memory 22L or writing decoded luminance data of the lower area in the memory 22L. That is, during processing of the upper area, luminance data flow through the memory bus B3, and chrominance data flow through the memory bus B4. On the other hand, during processing of the lower area, chrominance data flow through the memory bus B3, and luminance data flow through the memory bus B4. Therefore, the load is balanced, compared with the conventional system illustrated in FIG. 15.

Further, since the load imposed on the memories are balanced, the processing for decoding image data does not put pressure on the processing of data stored in the working areas in the memories 22U and 22L, and the data flow rates can be almost constant during the processing for decoding image data of the upper area and the lower area.

As explained before, in the conventional parallel processing of moving images, load imposed on the memories are greatly unbalanced, and varies with time. Therefore, the efficiency in memory access is low, and the load imposed on each memory is likely to reach its limit. On the other hand, in the image processing system 1 according to the present invention, the load imposed on the encoder-side memory unit 12 and the load imposed on the decoder-side memory unit 22 are each dispersed along the time axis. Therefore, it is possible to set a higher performance limit, and reduce costs and power consumption.

Although the above embodiment is explained by taking as an example the case where MPEG video ESs are handled, the present invention can also be applied to the cases where other types of moving images such as DV (digital video) images are handled. Further, although the screen is divided into the upper area and the lower area in the above embodiment, the present invention can also be applied to the cases where the screen is divided into N areas, and N operations are performed in parallel.

For example, in the case where N=3, the screen is divided into an upper area, a middle area, and a lower area, and three operations are performed in parallel. FIG. 13 is a diagram illustrating a parallel arrangement of three memories. In this example, three memories U, M, and L are provided as three storage areas, where the memory U stores luminance components of the upper area and chrominance components of the lower area, the memory M stores luminance components of the middle area and chrominance components of the upper area, and the memory L stores luminance components of the lower area and chrominance components of the middle area. Thus, the load imposed on the memories can be balanced.

As explained above, in an image encoder in the image processing system according to the present invention, data of divided portions of an original image are written in an encoder-side memory in a dispersed manner so that luminance data and chrominance data of an identical portion of the original image are not stored in an identical storage area in the encoder-side memory, and data of a reference image is stored in the encoder-side memory so as to contain information necessary for predictive coding of the data of divided portions of the original image. In addition, in an image decoder in the image processing system according to the present invention, data of divided portions of a decoded image are written in a decoder-side memory in a dispersed manner so that luminance data and chrominance data of an identical portion of the decoded image are not stored in an identical storage area in the decoder-side memory. Thus, it is possible to efficiently distribute load among the memories when an image is processed by dividing the image. Therefore, the efficiency in memory access can be enhanced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing system for performing processing for encoding and decoding image signals, comprising:
an image encoder including,
an encoder-side memory which has a plurality of storage areas and stores data,
an image-input-processing unit which divides an original image into a plurality of areas so as to generate divided original images, and writes the divided original images in said encoder-side memory in a dispersed manner so that luminance data of each of the divided original images are not stored in one of said plurality of storage areas of the encoder-side memory in which chrominance data of said each of the divided original images are stored, and
an encoding unit which divides a reference image into a plurality of areas so as to generate divided reference images each of which includes information necessary for predictive coding of one, corresponding to said each of the divided reference images, of luminance data sets and chrominance data sets representing the divided original images, stores each of the divided reference images in one of the plurality of storage areas of the encoder-side memory in which one of luminance data sets and chrominance data sets constituting the divided original images corresponding to said each of the divided reference images is stored, reads image data stored in said encoder-side memory, and performs processing for encoding the image data so as to generate encoded data, when predictive coding is performed; and
an image decoder including,
a decoder-side memory which has a plurality of storage areas and stores data,
a decoding unit which divides and decodes encoded data so as to generate divided decoded-data sets representing a decoded image, and writes the divided decoded-data sets in said decoder-side memory in a dispersed manner so that luminance data in each of the divided decoded-data sets are not stored in one of said plurality of storage areas of the decoder-side memory in which chrominance data in said each of the divided decoded-data sets are stored, and
an image-output-processing unit which reads the divided decoded-data sets stored in the decoder-side memory, and performs processing for outputting the decoded image.

2. The image processing system according to claim 1, wherein said plurality of storage areas in said encoder-side memory include first and second storage areas, said image-input-processing unit divides luminance data of the original image into an upper-area portion and a lower-area portion, divides chrominance data of the original image into an upper-area portion and a lower-area portion, stores the upper-area portion of the luminance data of the original image and the lower-area portion of the chrominance data of the original image in said first storage area, and stores the lower-area portion of the luminance data of the original image and chrominance data of the upper-area portion of the original image in said second storage area.

3. The image processing system according to claim 2, wherein said encoding unit stores in said first storage area, as one of said divided reference images corresponding to the upper-area portion of the luminance data of the original image, luminance data of an upper area and at least one horizontal line in a lower area of said reference image which are necessary for predictive coding of the upper-area portion of the luminance data of the original image, stores in said first storage area, as one of said divided reference images corresponding to the lower-area portion of the chrominance data of the original image, chrominance data of the lower area and at least one horizontal line in the upper area of said reference image which are necessary for predictive coding of said chrominance data of the lower area of the original image, stores in said second storage area, as one of said divided reference images corresponding to the lower-area portion of the luminance data of the original image, luminance data of the lower area and at least one horizontal line in the upper area of said reference image which are necessary for predictive coding of said luminance data of the lower area of the original image, and stores in said second storage area, as one of said divided reference images corresponding to the upper-area portion of the chrominance data of the original image, chrominance data of the upper area and at least one horizontal line in the lower area of said reference image which are necessary for predictive coding of said chrominance data of the upper area of the original image.

4. The image processing system according to claim 1, wherein said plurality of storage areas in said decoder-side memory include first and second storage areas, said decoding unit divides luminance data of the decoded image into an upper-area portion and a lower-area portion, divides chrominance data of the decoded image into an upper-area portion and a lower-area portion, stores the upper-area portion of the luminance data of the decoded image and the lower-area portion of the chrominance data of the decoded image in said first storage area, and stores the lower-area portion of the luminance data of the decoded image and the upper-area portion of the chrominance data of the decoded image in said second storage area.

5. An image encoder for performing processing for encoding image signals, comprising:
an encoder-side memory which has a plurality of storage areas and stores data;
an image-input-processing unit which divides an original image into a plurality of areas so as to generate divided original images, and writes the divided original images in said encoder-side memory in a dispersed manner so that luminance data of each of the divided original images are not stored in one of said plurality of storage areas of the encoder-side memory in which chrominance data of said each of the divided original images are stored; and
an encoding unit which divides a reference image into a plurality of areas so as to generate divided reference images each of which includes information necessary for predictive coding of one, corresponding to said each of the divided reference images, of luminance data sets and chrominance data sets representing the divided original images, stores each of the divided reference images in one of the plurality of storage areas of the encoder-side memory in which one of luminance data sets and chrominance data sets constituting the divided original images corresponding to said each of the divided reference images is stored, reads image data stored in said encoder-side memory, and performs processing for encoding the image data so as to generate encoded data, when predictive coding is performed.

6. The image encoder according to claim 5, wherein said plurality of storage areas in said encoder-side memory include first and second storage areas, said image-input-processing unit divides luminance data of the original image into an upper-area portion and a lower-area portion, divides chrominance data of the original image into an upper-area portion and a lower-area portion, stores the upper-area portion of the luminance data of the original image and the lower-area portion of the chrominance data of the original image in said first storage area, and stores the lower-area portion of the luminance data of the original image and chrominance data of the upper-area portion of the original image in said second storage area.

7. The image encoder according to claim 5, wherein said encoding unit writes the divided reference images in said encoder-side memory in a dispersed manner so that luminance data of each of the divided reference images are not stored in one of said plurality of storage areas of the encoder-side memory in which chrominance data of said each of the divided reference images are stored.

8. The image encoder according to claim 7, wherein said encoding unit stores in said first storage area, as one of said divided reference images corresponding to the upper-area portion of the luminance data of the original image, luminance data of an upper area and at least one horizontal line in a lower area of said reference image which are necessary for predictive coding of the upper-area portion of the luminance data of the original image, stores in said first storage area, as one of said divided reference images corresponding to the lower-area portion of the chrominance data of the original image, chrominance data of the lower area and at least one horizontal line in the upper area of said reference image which are necessary for predictive coding of said chrominance data of the lower area of the original image, stores in said second storage area, as one of said divided reference images corresponding to the lower-area portion of the luminance data of the original image, luminance data of the lower area and at least one horizontal line in the upper area of said reference image which are necessary for predictive coding of said luminance data of the lower area of the original image, and stores in said second storage area, as one of said divided reference images corresponding to the upper-area portion of the chrominance data of the original image, chrominance data of the upper area and at least one horizontal line in the lower area of said reference image which are necessary for predictive coding of said chrominance data of the upper area of the original image.

9. An image decoder for performing processing for decoding image signals, comprising:
   a decoder-side memory which has a plurality of storage areas and stores data;
   a decoding unit which divides and decodes encoded data so as to generate divided decoded-data sets representing a decoded image, and writes the divided decoded-data sets in said decoder-side memory in a dispersed manner so that luminance data in each of the divided decoded-data sets are not stored in one of said plurality of storage areas of the decoder-side memory in which chrominance data in said each of the divided decoded-data sets are stored; and
   an image-output-processing unit which reads the divided decoded-data sets stored in the decoder-side memory, and performs processing for outputting the decoded image.

10. The image decoder according to claim 9, wherein said plurality of storage areas in said decoder-side memory include first and second storage areas, said decoding unit divides luminance data of the decoded image into an upper-area portion and a lower-area portion, divides chrominance data of the decoded image into an upper-area portion and a lower-area portion, stores the upper-area portion of the luminance data of the decoded image and the lower-area portion of the chrominance data of the decoded image in said first storage area, and stores the lower-area portion of the luminance data of the decoded image and the upper-area portion of the chrominance data of the decoded image in said second storage area.

* * * * *